United States Patent
Burenius

(10) Patent No.: US 9,838,646 B2
(45) Date of Patent: Dec. 5, 2017

(54) ATTENUATION OF LOUDSPEAKER IN MICROPHONE ARRAY

(71) Applicant: Cisco Technology, Inc., San Jose, CA (US)

(72) Inventor: Lennart Burenius, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/863,605

(22) Filed: Sep. 24, 2015

(65) Prior Publication Data

US 2017/0094223 A1    Mar. 30, 2017

(51) Int. Cl.
| | |
|---|---|
| *H04R 5/00* | (2006.01) |
| *H04N 7/15* | (2006.01) |
| *H04R 1/40* | (2006.01) |
| *H04N 7/14* | (2006.01) |
| *H04R 3/00* | (2006.01) |
| *H04R 27/00* | (2006.01) |

(52) U.S. Cl.
CPC ............... *H04N 7/15* (2013.01); *H04N 7/147* (2013.01); *H04R 1/406* (2013.01); *H04R 3/005* (2013.01); *H04R 27/00* (2013.01); *H04R 2227/003* (2013.01)

(58) Field of Classification Search
USPC ................................ 381/92, 122, 56, 81, 85; 348/14.01–14.09
See application file for complete search history.

(56) References Cited

U.S. PATENT DOCUMENTS

| | | | |
|---|---|---|---|
| 6,011,851 A | 1/2000 | Connor et al. | |
| 7,586,513 B2 | 9/2009 | Muren et al. | |
| 7,664,272 B2 * | 2/2010 | Terai | H04S 1/005 381/1 |
| 8,126,183 B2 | 2/2012 | Enstad et al. | |
| 8,315,407 B2 * | 11/2012 | Jeon | H04S 1/007 367/118 |
| 8,675,890 B2 * | 3/2014 | Schmidt | G10L 21/0272 381/92 |

(Continued)

OTHER PUBLICATIONS

Brutti et al., Localization of Multiple Speakers Based on a Two Step Acoustic Map Analysis, 2008, Acoustics, Speech and Signal Processing.

(Continued)

*Primary Examiner* — Maria El-Zoobi

(57) ABSTRACT

In one implementation, an apparatus includes a camera, a loudspeaker, a plurality of microphones, and a controller. The apparatus may be a computer, a mobile device such as a smart phone, or a dedicated videoconference device. The plurality of microphones are configured to produce sound data. A first number of the plurality of microphones are arranged on a first side of the loudspeaker, and a second number of the plurality of microphones are arranged on a second side of the loudspeaker. Different quantities of the microphones may be included on each side of the loudspeaker. The controller is configured to calculate a cross-correlation of the plurality of microphones based on the sound data and attenuate the cross-correlation based on a time-delay window and an attenuation factor. A participant location is determined based on the attenuated cross correlation functions.

17 Claims, 8 Drawing Sheets

(56) References Cited

U.S. PATENT DOCUMENTS

| | | | |
|---|---|---|---|
| 8,675,980 B2* | 3/2014 | Liege | G06T 1/0007 |
| | | | 382/167 |
| 8,842,842 B2* | 9/2014 | Eppolito | H04S 3/008 |
| | | | 381/19 |
| 9,319,633 B1 | 4/2016 | Birkenes et al. | |
| 9,473,841 B2* | 10/2016 | Nugent | H04R 1/406 |
| 2016/0057385 A1 | 2/2016 | Burenius | |

OTHER PUBLICATIONS

Omologo et al., Multi-Microphone Signal Processing for Distant-Speech Interaction, Oct. 3, 2012, Human Activity and Vision Summer School.

Lifesize, "Lifesize Phone," Datasheet, https://www.lifesize.com/~/media/Documents/Product%20Documentation/Phone%202nd%20Generation/Product%20Datasheets/Phone%202nd%20Generation%20Datasheet%20EN.ashx., Feb. 2016, 2 pages.

Lifesize, "LifeSize Phone User Guide," https://www.lifesize.com/~/media/Documents/Product%20Documentation/Phone/Guides%20and%20Reference/Phone%20User%20Guide%2030%20EN.ashx., Apr. 2008, 15 pages.

Polycom, "SoundStation Installation Instructions and User's Guide," http://www.support.polycom.com/PolycomService/support/cn/support/voice/soundstation/soundstation.html, Jan. 1994, 20 pages.

Cisco, "Cisco Unified IP Conference Phone 8831," Data Sheet, http://www.cisco.com/c/en/us/products/collaboration-endpoints/unified-ip-conference-phone-8831/index.html, Nov. 2016, 9 pages.

Amazon, "Amazon Echo Quick Start Guide," https://s3-us-west-2.amazonaws.com/.../Amazon_Echo_Quick_Start_Guide.pdf , retrieved Jun. 28, 2017, 1 page.

Brutti, et al., "Localization of Multiple Speakers Based on a Two Step Acoustic Map Analysis," IEEE International Conference on Acoustics, Speech and Signal Processing 2008, ICASSP 2008, Mar.-Apr. 2008, 4 pages.

Omologo, "Multi-Microphone Signal Processing for Distant-Speech Interaction," Human Activity and Vision Summer School (HAVSS), Oct. 2012, www.idiap.ch/~odobez/HAVSS/2012-10-HAVSS-Wednesday-Omologo-Audio.pdf, 79 pages.

Cisco, "Cisco Unified IP Conference Phone 8831," Deployment Guide, http://www.cisco.com/c/en/us/products/collaboration-endpoints/unified-ip-conference-phone-8831/index.html, Apr. 2015, 6 pages.

* cited by examiner

ATTENUATION OF LOUDSPEAKER IN MICROPHONE ARRAY

TECHNICAL FIELD

This disclosure relates in general to the field of microphone arrays, and more particularly, to audio localization using microphone arrays.

BACKGROUND

Human process sounds received at two ears, which perform similar to microphones. The sounds is processed to distinguish different sound sources both by types of the sound sources and location of the sound sources. The human brain performs this processing, which may be referred to as binaural processing, in an efficient and effective manner.

Computer science, on the other hand, has not yet mastered binaural processing. Instead of two ears, computer science techniques rely on many more microphones in order to estimate the location of a sound source. When multiple sound sources are present, the problem becomes increasingly difficult. In addition, where there is a loudspeaker, which is likely the case in videoconferencing environments, the speaker is often located very close to the microphones.

The loudspeaker is a constant noise source because it plays room and comfort noise from the far end participants. The noise may not be heard by the local participants because the local participants are likely located a couple meters or more away from the constant noise source. However, the microphones may only be a few centimeters from the constant noise source. Thus, the constant noise source may significantly impact calculations for estimating the source of the local sound (i.e., the local participants) based on the output of the microphones.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In an embodiment, sound data is received from a planar arrangement of microphones. The planar arrangement of microphones is asymmetric with respect to a location of a loudspeaker. At least one primary pair of microphones that is arranged linearly in a first direction is selected from the planar arrangement of microphones. At least one supplemental pair of microphones that is arranged in a second direction is selected from the planar arrangement of microphones. The second direction is at an angle to the first direction. A first cross correlation function is modified for the at least one primary pair of microphones based on a first window and a first attenuation factor, and a second cross correlation function for the at least one supplemental pair of microphones based on a second window and a second attenuation factor.

In an embodiment, an apparatus includes a camera, a controller, a loudspeaker, and a plurality of microphones configured to produce sound data. A first number of the plurality of microphones are arranged on a first side of the loudspeaker, and a second number of the plurality of microphones are arranged on a second side of the loudspeaker. The controller configured to calculate a cross-correlation of the plurality of microphones based on the sound data and calculate the cross-correlation based on a time-delay window and an attenuation factor. A participant direction is selected based on the attenuated cross correlation.

Example Embodiments

Figure 1:
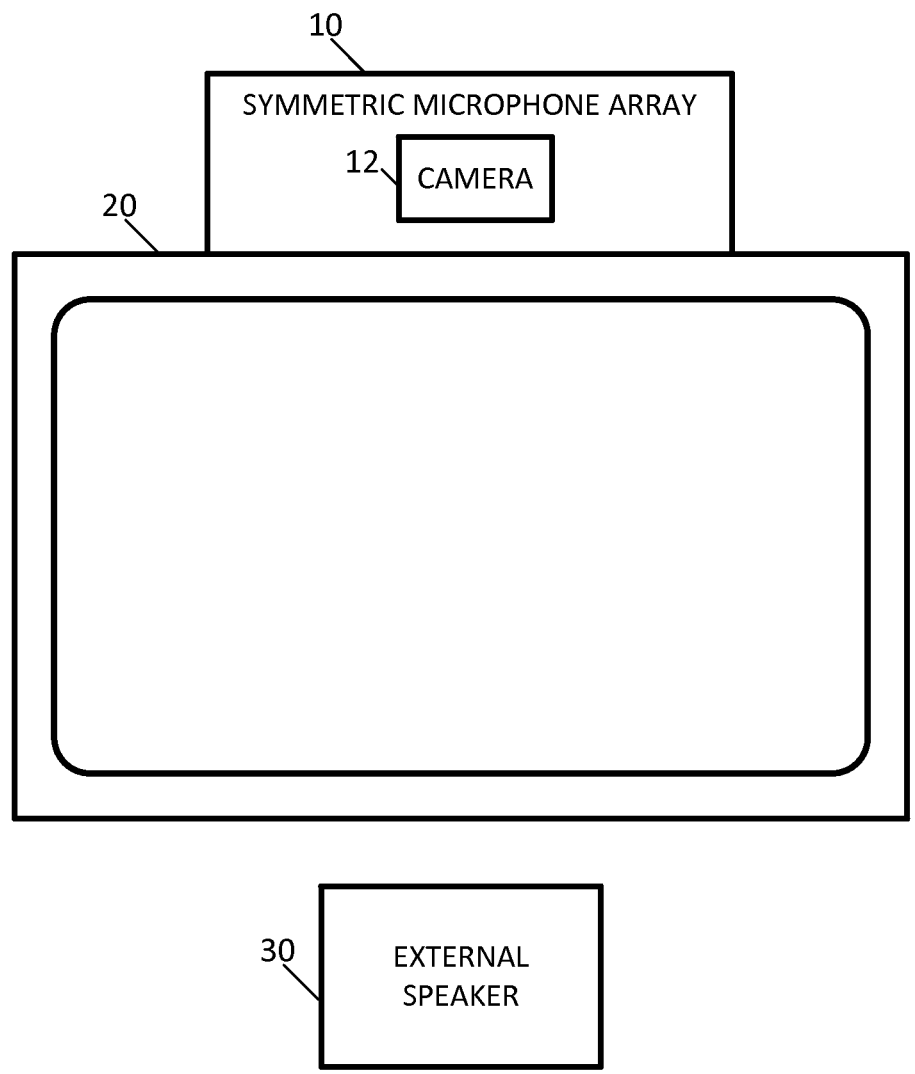
FIG. 1 illustrates an example of a symmetric microphone array.

FIG. 1 illustrates an example conferencing system including a symmetric microphone array 10, one or more cameras 12, a display 20, and an external speaker 30 (e.g., loudspeaker). The conferencing system, which includes a local participant or a local end of a video conference, is in communication with another conferencing system, which is a remote participant or a remote end of the video conference. The symmetric microphone array 10 may include a number of microphones symmetrically arranged or centered around the one or more cameras 12. The symmetric microphone array 10 may include a planar two-dimensional (2D) microphone array centered around the one or more cameras 12 may be used to estimate the azimuth angle, elevation angle and/or distance to a sound source. The sound source may be a participant in a video conference or another source of sound in the vicinity of the symmetric microphone array 10.

The loudspeaker 30 is spaced at least a predetermined distance from the symmetric microphone array 10. The predetermined distance may be 20 centimeters or more, depending on the loudspeaker's maximum sound pressure level. Higher sound pressure levels require longer distance. For best performance, it is recommended to place the loudspeaker 30 as far away from the microphone array 10 as practically possible. If the loudspeaker 30 is replaced with an internal speaker closely located to the symmetric microphone array 10 and the one or more cameras 12, the internal speaker interrupts with the identification and isolation of the intended sound source (e.g., active speaking participant).

The conference system's loudspeaker may be equivalent to or modeled as a constant noise source. The constant noise source emits room noise or comfort noise from the far end participants during a video conference. The room noise is unintended noise transmitted from the remote conferencing system to the local conferencing system. The comfort noise is synthetic noise generated in system when no sound is transmitted when the sound is below a minimum level. Users may find comfort in hearing some noise at all times because when the speaker is completely silent, users may perceive that a malfunction or a disconnection has occurred.

These noises, in most cases, are not heard at the local participant's location because the participants are a few meters away from the constant noise source. Thus, the constant noise is masked by the local room noise. However, the constant noise may be very significant a few centimeters away from the loudspeaker, where the microphones of the symmetric microphone array 10 are located.

The following embodiments provide a technique to extract robust audio localization information from a microphone array despite that the microphones are located very close to one or more constant noise sources. The following embodiments may include an asymmetric microphone array geometry that maximizes the distance between the loudspeaker and microphones in a given physical form factor. The following embodiments may attenuate the loudspeaker position in cross-correlation functions of each microphone pair that are used in the audio localization algorithm. The amount of attenuation may be a function of the microphone location relative to the loudspeaker for each pair. The term loudspeaker, rather than speaker, may be used to distinguish sound sources from videoconference participants, which may also be referred to as speakers.

Figure 2:
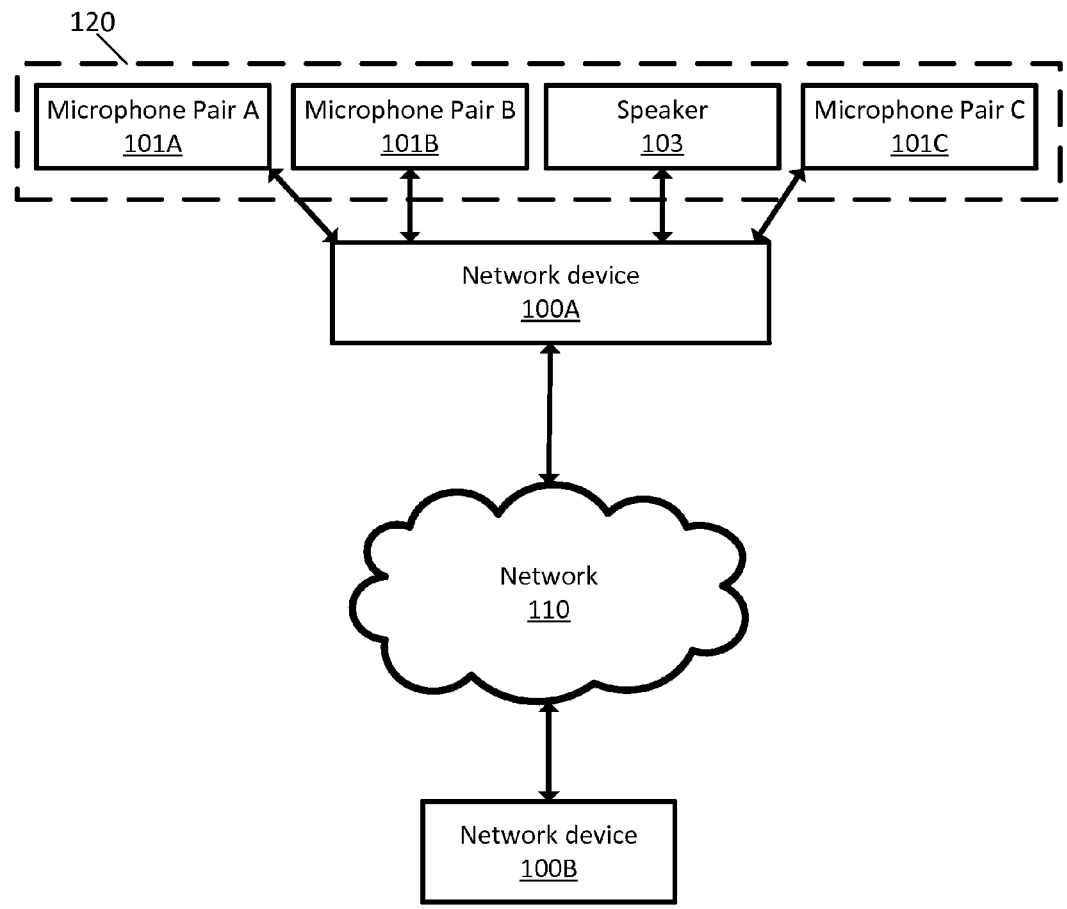
FIG. 2 illustrates an example communication system with integrated loudspeaker and audio localization using an asymmetric microphone array.
Figure 3:
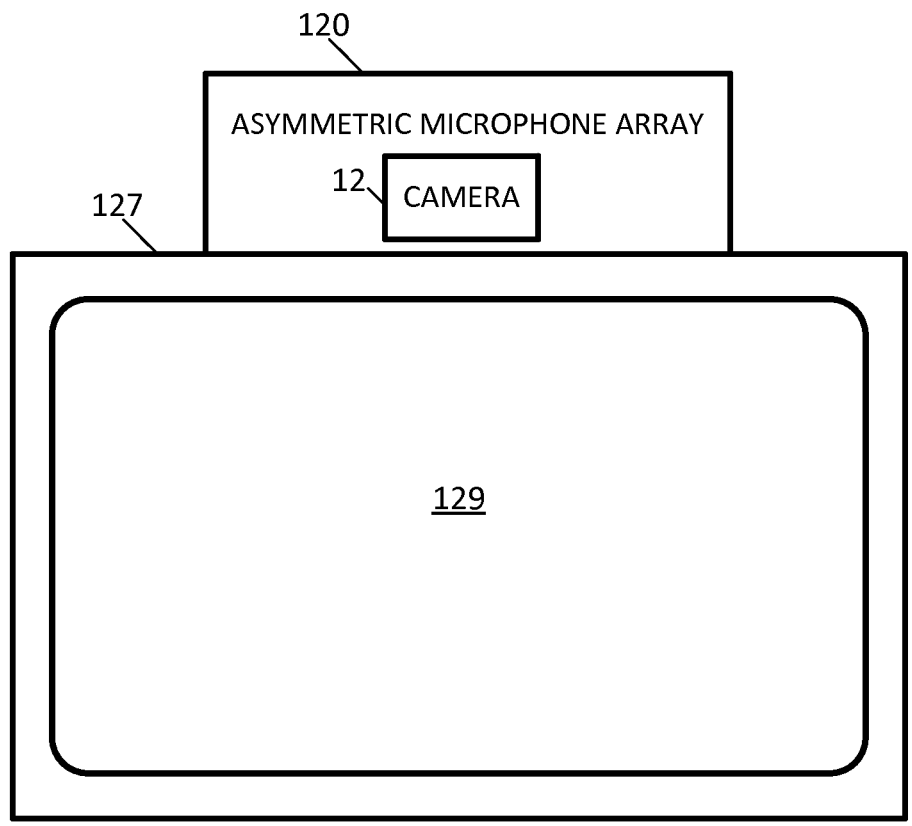
FIG. 3 illustrates an example system for audio localization using an asymmetric microphone array.

FIG. 2 illustrates an example local videoconferencing system for audio localization using an asymmetric microphone and camera array 120 including microphones and a camera 12, and a network device 100A. FIG. 3 illustrates an example view of the asymmetric microphone and camera array 120 mounted on a videoconference device 129 having display 129. The local videoconferencing system is in communication with a remote videoconferencing system via a network 110. In addition to the network device 100B, the remote videoconferencing system may include another asymmetric microphone and camera array 120. Additional, different, or fewer components may be included.

The network device 100A, as well as network device 100B, may support a conference endpoint. The network devices may include a video display, a video processing module, and an audio processing module. One or more of the network devices may be a smart phone, a personal computer (e.g., laptop computer, tablet computer, desktop computer), or a standalone videoconferencing device.

Near the network device 100A is one or more local conference participants, and near the network device 100B is one or more remote conference participants. Individual participants may be an active speaker (a person who is currently a speaker) or an inactive speaker (a person who is only listening or a person who is speaking but not selected to participate in the audio conference) during a given period of time.

The network device 100A may be configured to receive sound data from a planar arrangement of microphones. A planar arrangement of microphones extends in at least two dimensions. Thus, some of the microphones are spaced in a first direction and some of the microphones are spaced in a second direction that is perpendicular to the first direction. The planar arrangement of microphones is asymmetric with respect to a location of a loudspeaker. The arrangement of microphones is asymmetric be a different pattern of microphones is present on one side of the loudspeaker than the opposite side of the loudspeaker. The arrangement of microphones may be asymmetric with respect to all possible orientations of the loudspeaker. In other words, there is no way to bisect the area of the loudspeaker such than the microphones on one side of the loudspeaker are symmetric with the microphones on the opposite side of the loudspeaker with respect to the line bisecting the loudspeaker.

The network device 100A may select at least one primary pair of microphones from the planar arrangement of microphones. The primary pair of microphones is arranged linearly in a first direction. The first direction may be any direction. The network device 100A receives sound data from the primary pair of microphones and derives the sound angle of arrival (SA) based on a time difference $\Delta t$ between time-of-arrivals (TOAs) of sound received at (and transduced by) the individual microphones. The sound angle of arrival SA may be determined based on the following formula: $SA = \arcsin(\Delta t \ast c / d)$, where: $\Delta t$=the TOA time difference; d=the individual microphone spacing; and c=the speed of sound in air at a given air temperature T. The time difference $\Delta t$ may be calculated from the cross-correlation of the audio data segments from the two microphones since the cross-correlation function is a measure of the similarity between signals for any given time displacement. The cross correlation exhibits a maximum where the signals are best aligned, corresponding to the TOA time difference between the two microphones, as shown by Equation 1:

$$\Delta t = \operatorname*{argmax}_{\tau}(s_i \star s_j)[\tau] \qquad \text{Eq. 1}$$

where $(s_i \ast s_j)[\tau]$ denotes the cross correlation between data from microphone i and j. It is usually computed and normalized in the frequency domain; first converting the audio data segments using the Fast Fourier Transform (FFT) and after computation use the Inverse FFT (IFFT) to convert back to the cross correlation domain. One example cross-correlation technique that may be used is the Generalized Cross Correlation with Phase Transform (GCC-PHAT). Additionally, a distance between a position from which the sound originates and microphone array 120 may also be determined based on the combination of multiple cross-correlation functions derived from different microphone pairs that are spatially spaced apart within the array.

The network device 100A also selects at least one supplemental pair of microphones from the planar arrangement of microphones. The supplemental pair of microphones is arranged linearly in a second direction at an angle to the first direction. In one example, the first direction is horizontal and the second direction is vertical, and in another example, the second direction is horizontal and the first direction is vertical. Alternatively, the first and second directions may be at different orientations and orthogonal or even any two directions at any angle.

The network device 100A may calculate one or more angles to the sound source based on the supplemental pair of microphones. The angle to the sound source may be an azimuth angle. The azimuth angle may be a horizontal angle from a predetermined direction (e.g., a north pole) to the sound source. The angle to the sound source may be an elevation angle. The elevation angle is an angle from a horizontal plane to the sound source in the vertical direction. The elevation angle may define a right triangle that determines the elevation or height of the sound source. That is, the network device 100A may calculate an altitude or elevation of the sound source based on the supplemental pair of microphones.

The network device 100A may calculate either angle to the sound source based on the sound data received from the supplemental pair of microphones. Similarly to the primary pair of microphones described above, the network device 100A may analyze the sound data from the supplemental pair of microphones. The network device 100A receives sound data from the supplemental pair of microphones and derives the sound angle of arrival (SA) based on a time difference Δt between time-of-arrivals (TOAs) of sound received at (and transduced by) the individual microphones. The sound angle of arrival SA may be determined based on the following formula: SA=arcsin(Δt*c/d), where: Δt=the TOA time difference; d=the individual microphone spacing; and c=the speed of sound in air at a given air temperature T. The time difference Δt may be calculated from the cross-correlation of the audio data from the two microphones. An example cross-correlation technique that may be used is the Generalized Cross Correlation with Phase Transform (GCC-PHAT).

The network device 100A may store, calculate based on geometry or measure the transfer function sample delay between the loudspeaker and each microphone and translate these delays to a peak in the cross-correlation function for each microphone pair. Before combining the information from each microphone pair, the loudspeaker position can now be attenuated in the cross-correlation function of each microphone pair by multiplying a time-delay window (T) centered on the peak with an attenuation factor (α). A different time-delay window and a different attenuation factor may be used for each pair of microphones in the planar arrangement of microphones. Thus, the network device 100A may attenuate the loudspeaker position in the cross correlation function of the primary pair of microphones based on a first window and a first attenuation factor and attenuate the cross correlation function of the supplemental pair of microphones based on a second window and a second attenuation factor.

Figure 4A:
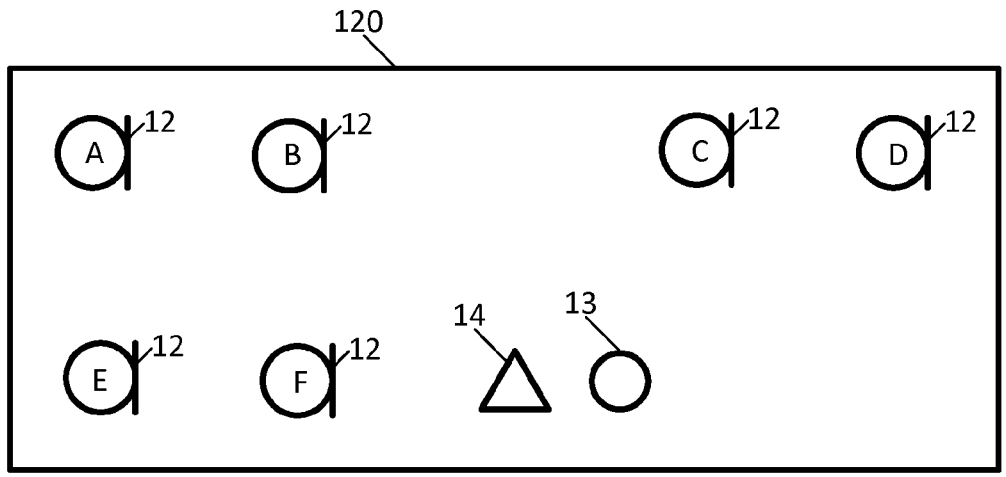
FIGS. 4A-4C illustrate example asymmetric microphone arrays.
Figure 4B:
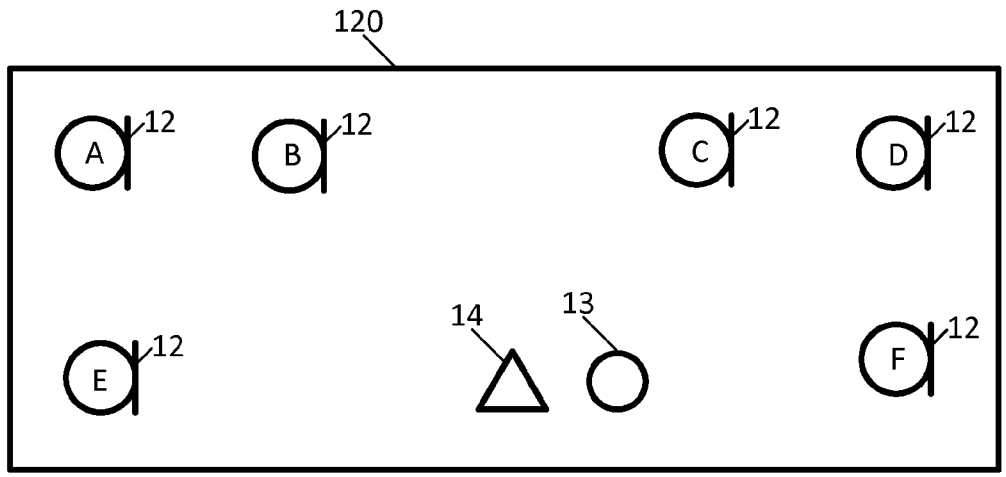
Figure 4C:
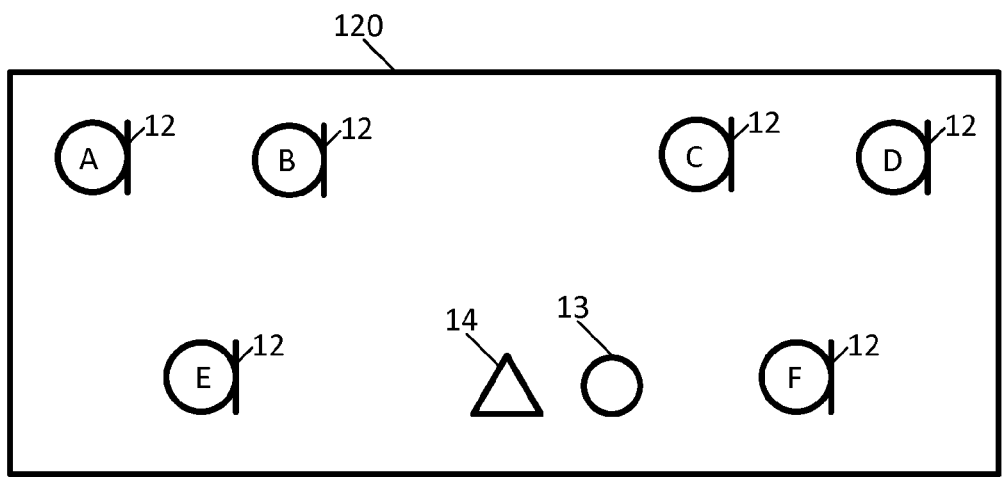

After attenuation, the network device 100A may combine the first cross correlation function and the second cross correlation function. The network device 100 performs a peak detection algorithm on the combined first cross correlation function and the second cross correlation function. The most simple peak detection algorithm is to find the location of the global maxima. From the result of the peak detection algorithm, the network device 100A identifies a candidate speaker location FIGS. 4A-4C illustrate example videoconference devices including a loudspeaker 13, a camera 14, and an asymmetric microphone array of microphones 12. The microphones are referred to collectively as microphones 12, and individually using letters A-F. The camera 14 is centered in the videoconference device in the horizontal direction. The camera 14 may also be centered is the vertical direction. The loudspeaker 13 is located off-center, or not in the center. A distance between the loudspeaker 13 to the center of the videoconference device may be with a predetermined range. The predetermined range may be defined by the size of the camera (i.e., the radius of the lens of the camera). The loudspeaker 13 may produce sound for a center loudspeaker channel, and there may be speakers for additional channels placed much farther from the camera 14 and the microphones 12.

The asymmetric microphone array may include more microphones on one side of the camera 14 than on the other side of the camera with respect to a horizontal direction. For example, in FIG. 4A, four microphones (A, B, E, F) are to the left of the camera 14, and two microphones (C, D) are to the right of the camera. To maximize the distance to the loudspeaker 13, the majority of the microphones are placed on the opposite side of the camera 14, which results in an asymmetric array.

In this example, the audio elevation estimation is calculated using the four microphones (A, B, E, F) to the left. These microphones are sufficient because the microphones are centered around the horizontal plane of the camera 14. The elevation estimation includes microphones pairs using microphones that are spatially spaced apart in the vertical direction. For added robustness and performance, cross-correlation functions from several such pairs can be combined before finding the elevation estimate using a peak detection algorithm.

For the elevation calculation, the best microphone pair is A-E since they are vertical spaced and furthest away from the loudspeaker. Suitable microphone pairs for the elevation calculation may also include A-F and B-E because they are diagonally arranged and thus also provide elevation information, and has significantly different distances to the loudspeaker compared to pair A-E. The later avoids blind spots after the attenuation of the loudspeaker has been performed in each pairs cross-correlation function.

The two microphones (C, D) to the right, on the same side as the loudspeaker, may only be needed for azimuth and distance estimation. The azimuth calculation may involve four microphones (e.g., the linear array of A-B-C-D) since they are positioned in the horizontal direction. The azimuth calculation may involve several pairs of this linear subset of the microphone array for added robustness.

The distance calculation may involve two or more microphone pairs that are spaced apart within the array. In this example, pairs A-B and C-D are the most suitable pairs since they pairs are positioned along the same plane and are the most spaced apart, and thus the difference in SA and Δt are maximized which improves the accuracy of the distance estimation of the sound source.

In FIG. 4B, three microphones 12 are on each side of the camera 14. In this example, microphone E is aligned vertically with microphone A and microphone F is aligned vertically with microphone D. The four microphones can therefore be used for elevation calculation. In this example, the azimuth and distance calculation may include the same microphones as the example in FIG. 4A.

In FIG. 4C, three microphones 12 are on each side of the camera 14. In this example, microphone E is not aligned (e.g., centered horizontally) between microphones A and B, and microphone F is not aligned (e.g., centered horizontally) with microphones C and D. But since the microphones are spaced vertically, microphone pairs that includes microphone E or F can still provide elevation information. In this example, the azimuth and distance calculation may include the same microphones as the example in FIG. 4A.

Figure 5A:
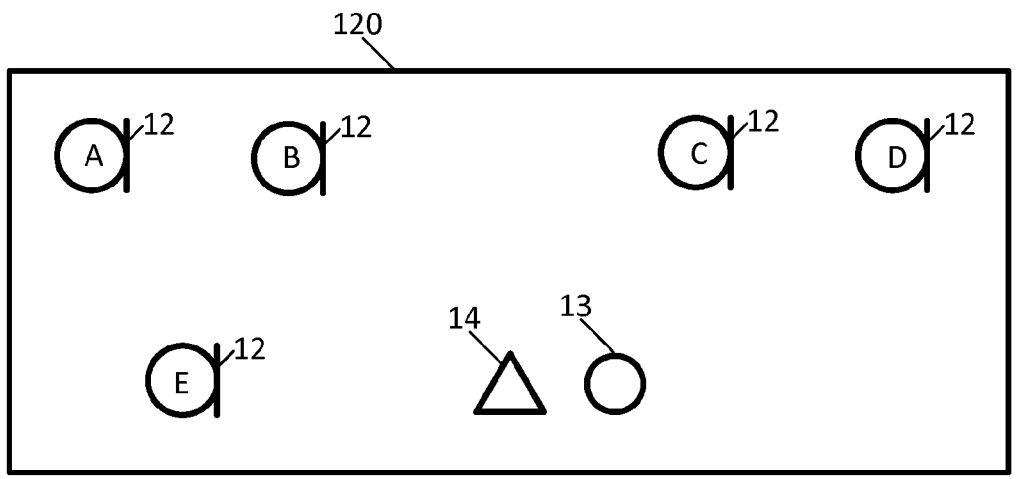
FIGS. 5A-5C illustrate example asymmetric microphone arrays.
Figure 5B:
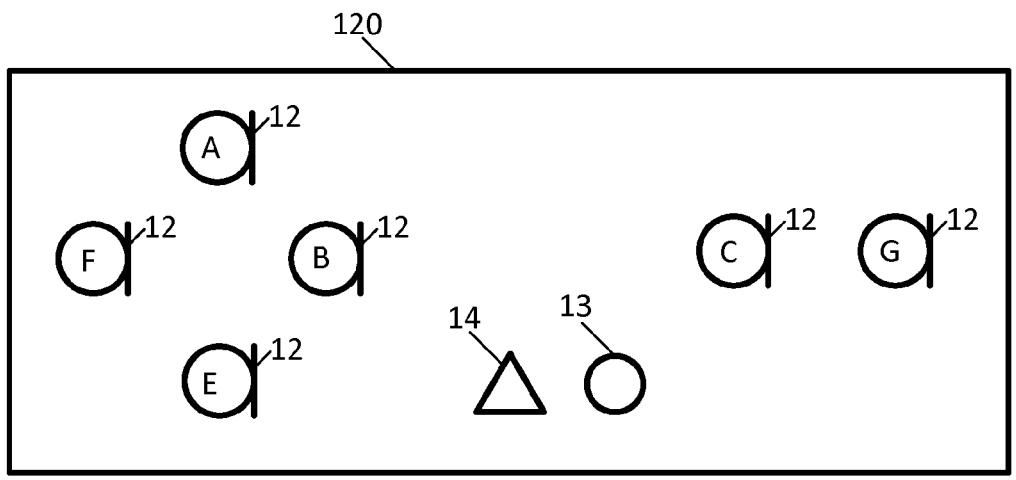
Figure 5C:
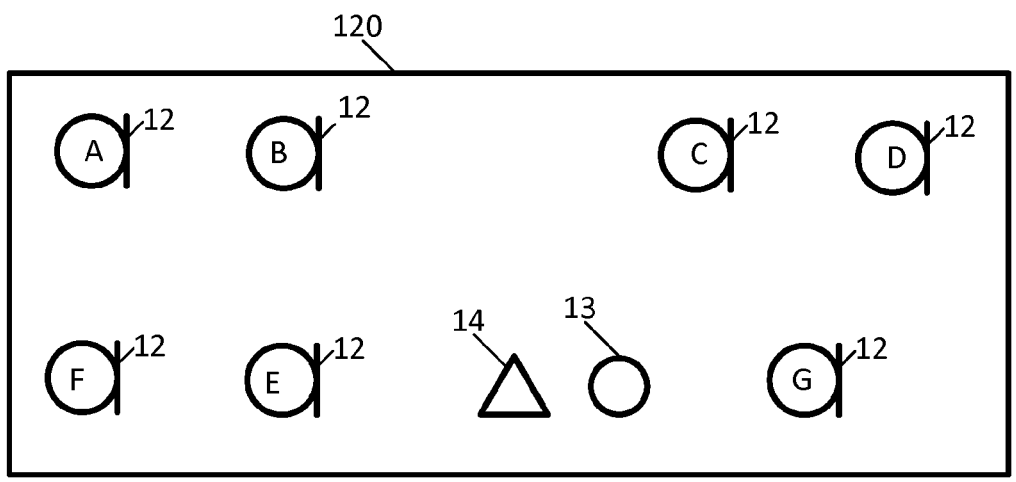

FIGS. 5A-5C illustrate example videoconference devices including a loudspeaker 13, a camera 14, and an asymmetric microphone array of microphones 12. The microphones are referred to collectively as microphones 12, and individually using letters A-G.

In the arrangement of FIG. 5A, three microphones 12 are to the left of the camera 14 and loudspeaker 13, and two microphones 12 are on the right. Microphones A, B, C, D are arranged linearly in the horizontal direction. In the arrangement of FIG. 5B, four microphones 12 are to the left of the camera 14 and loudspeaker 13, and two microphones 12 are on the right. Microphones A, B, F, and E are arranged in a diamond shape. Microphones A and E are arranged linearly in a vertical direction. Microphones F, B, C, G are arranged linearly in a horizontal direction. In the arrangement of FIG. 5C, four microphones 12 are to the left of the camera 14 and loudspeaker 13, and three microphones 12 are on the right. Microphones A, B, F, and E are arranged in a rectangle or square shape. Microphones pairs A, B, C and D are arranged linearly in the horizontal direction. Microphone pairs A and F as well as B and E are arranged linearly in a vertical direction. Microphones F, E, and G are arranged linearly in a horizontal direction. In any of these examples, an attenuation factor (α) and the width of the window (T) should be chosen and optimized for each individual microphone pair.

The sound field created by a sound source in the room can be seen as a sum of the direct sound field and a reverberant field, where the room reverberation has been modeled as a diffuse field, i.e. a spherically isotropic sound field. Direct sound waves travel directly to the microphone without being reflected. It can be shown that the sound pressure level at a microphone as function of distance r from one source can be expressed as in Equation 2.

$$L_p(\theta, \varphi) = L_W + 10 \log_{10}\left(\frac{D(\theta, \varphi)}{4\pi r^2} + \frac{4}{A_S}\right) \quad \text{Eq. 2}$$

$L_w$ is the sound power level of the source [dB re. $10^{-12}$ W], $A_s$ is the total room absorption [$m^2 S$, i.e. so-called metric unit sabin] and D is the directivity factor of the source, that in the case of an omnidirectional source equals one. This equation is based on Sabine's theory and holds reasonably well where the diffuse field condition exists. The direct sound falls 6 dB each time the distance from the source is doubled, while the diffuse part remains constant throughout the room. The distance where the contribution from the direct sound field equals the contribution from the diffuse fields is the critical distance. Through algebraically manipulating equation 2, the critical distance can be defined by Equation 3.

$$r_c = \sqrt{\frac{D(\theta, \varphi) A_S}{16\pi}} \quad \text{Eq. 3}$$

Considering the size and reverberation times of typical meeting rooms used for video conferencing, the value of $r_c$ may be in the range of 0.2-5.0 meters, or more specifically, 0.4-1.0 meters.

Since the microphones 12 are within the critical distance $r_c$ as defined in Equation 2 described above, of the internal loudspeaker 14 where the direct sound from the loudspeaker 14 dominates the acoustic transfer function, there may be a strong correlation between the amplitude of the peak in the cross-correlation function and the distance between the loudspeaker and the microphone located closest to it. The attenuation factor (α) for microphone pair N can therefore be optimized by Equation 4:

$$\alpha_N = a \cdot r_{min,N} \quad \text{Eq. 4}$$

The term $r_{min,N}$ is the distance between the loudspeaker 14 and the closest microphone 12 in pair N, and (a) is the reference attenuation for a microphone at 1 m distance from the loudspeaker. In some experiments, experiments have shown that a=0.4 is suitable value for the reference attenuation for the array example in FIG. 4A. Other values for the reference attenuation may be used. A range for the reference attenuation may be 0.2 to 0.8 or from 0 to 1.0.

The width of the window (T) is measured in time difference. The width may depend on both the local acoustic properties of the videoconferencing device, the microphones and the bandwidth of the noise. One technique to optimize the width of the window ($T_N$) for microphone pair N is included in Equation 5:

$$T_N = F_S \cdot L \cdot f\left(\frac{r_{max,N}}{r_{min,N}}\right) \quad \text{Eq. 5}$$

$F_s$ is the sampling frequency of the audio analog to digital converter, L is the up-sampling factor and f(x) is a positive function. The sampling frequency can be the commonly used 48 kHz, or any other suitable frequency.

The up-sampling factor refer to the up-sampling of the audio data, used to improve the resolution in the cross-correlation domain. The up-sampling factor may be 1 or higher. If no up-sampling is used, the factor is 1 and can in this case be omitted from Equation 5.

That is, a larger difference between the distances to the two microphones in a pair results in a wider, or longer, window. Once the time-delay window T and the attenuation factor have been calculated, the loudspeaker position is attenuated from the cross-correlation function of each microphone pair by multiplying the time-delay window (T) centered on the peak with an attenuation factor (α). A different time-delay window and a different attenuation factor may be used for each pair of microphones in the planar arrangement of microphones.

During run-time (e.g., during a videoconference), the network device 100A combines the information from the cross-correlation functions of all the pairs after the individual attenuation has been applied. The network device 100A determines the most likely candidate using a peak-detection algorithm, such as finding the global maximum of the cross-correlation function.

The network device 100A may estimate the azimuth angle, elevation angle and/or distance to a sound source. Each estimation may be based on three pairs of microphones. Thus, three pairs of microphones may be used for estimating the azimuth angle, three pairs of microphones may be used for estimating the elevation angle, and three pairs of microphones may be used for estimating the distance to the sound source. In one example, each of the three or more elevation pairs of microphones includes one microphone from the primary pair of microphones and one microphone from the supplemental pair of microphones.

Basing the estimation on multiple microphone pairs adds a redundancy. For example, if the network device 100A suppresses a peak in the cross-correlation function for a single microphone pair, a blind zone may be created. In the blind zone, no people can be detected unless they speak very loud. The redundancy circumvents this problem by using two or more pairs for each angular estimate, since their only common blind zone will be the location of the loudspeaker. In the ideal case without near field noise sources, these microphone pair would provide redundant information when determining the angles. For distance estimation, three or more pairs are used for the same purpose.

From the azimuth angle, the elevation angle, and the distance, the network device 100A determines a location of the sound source. The distance value defines a sphere. The distance may be measured from the camera of the camera array 120, the distance may be measured from the closest microphone of a microphone pair, or the distance may be measured from an average location of a pair of microphones. The azimuth angle and the elevation angle are spherical coordinates. Each azimuth angle and elevation angle pair of values defines a unique position on the sphere.

The network device 100A may generate a camera command based on the location of the sound source. The camera 14 typically includes pan, tilt, and zoom (PTZ) features that may be implemented mechanically and/or digitally. The camera command may be instruct a motor to move the camera 14 to include the sound source in a field of view of the camera 14. The camera command may include a number of steps for a stepping motor. The camera command may include a direction and an angle to move the camera 12.

In one embodiment, an endpoint includes a multichannel loudspeaker system. The endpoint may be a collaboration endpoint with left, right and center loudspeaker channels that support directional audio functionality. The microphone pairs used, and their associated filtering, may be switched dynamically depending on which loudspeaker channel that is currently active. For example, when the left loudspeaker is playing the high frequencies, only microphone around the right (inactive) loudspeaker are used, and vice versa.

In another embodiment, the position of the loudspeaker is not known in advance. Instead, the position of the loudspeaker is detected. This can be done using metadata from the loudspeaker output. The location of the loudspeaker may be determined using the microphone array during periods when the loudspeaker output is known to be high, and thereafter attenuate that position using the above technique. For example, a distance is calculated based on the output level of the speaker, the sensitivity of the microphone and the known attenuation of sound of the known frequency in air.

In another embodiment, the above technique is used to attenuate the influence of fan noise in an endpoint with integrated fan for cooling purposes. Just like an integrated loudspeaker that playback room and comfort noise, such fan generate noise at a close distance to the microphones and can therefor degrade the audio localization performance in a similar manner.

Figure 6:
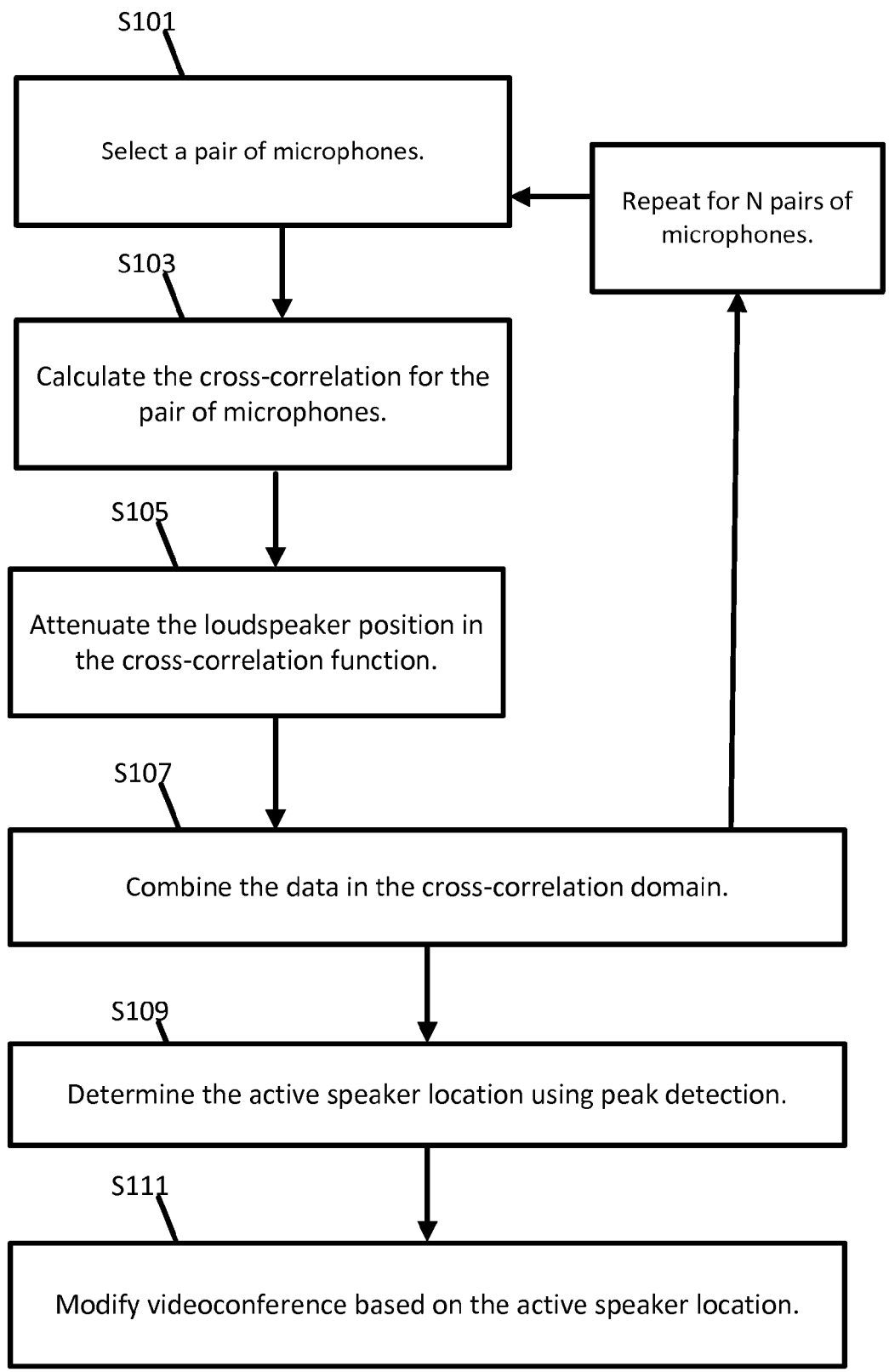
FIG. 6 illustrates an example flowchart for audio localization using an asymmetric microphone array.

FIG. 6 illustrates an example flowchart for audio localization using an asymmetric microphone array with integrated loudspeaker. Additional, different, or fewer acts may be included. The acts are performed in the order shown or other orders. The acts may also be repeated.

In act S101, an endpoint device in a videoconference session selects at least a pair of microphones from a set of microphones. The videoconference session may be established after the endpoint device and one or more remote endpoint devices exchange session initialization messages and/or exchange encryption keys. The set of microphones may include the primary microphones and supplemental microphones described above. The endpoint device analyzes the set of microphones in pairs.

In act S103, the endpoint device calculates the cross-correlation for the selected pair of microphones based on signals from the two microphones. The cross-correlation may be based on the Fourier transforms and complex conjugates of the signal from the pair of microphones.

In act S105, the endpoint device attenuates the peaks in the microphone pair's cross-correlation function that originates from constant noise played on the internal loudspeaker during the conference session. The amount of attenuation may be individually tuned for each microphone pair N by using individual time-delay windows $T_N$ and attenuation factor $\alpha_N$ as described above.

In act S107, the endpoint device combines the data in the cross-correlation domain from the N pairs of microphones. In act S109, based on the peak in the cross-correlation domain, the endpoint device determines the active speaker location according to the examples above.

In act S111, the endpoint device modifies the video conference in response to the active speaker location. In one example, the endpoint device may display only a portion of video collected by a camera that depicts the active speaker location. The endpoint device may transmit to the other participants of the videoconference session a video signal including only the active speaker location. In some examples, the endpoint device crops the video from the view of the camera that includes the active speaker. In other examples, the endpoint device changes the view of the camera to include the active speaker. The endpoint device may zoom the camera to enlarge the active speaker. The endpoint device may generate a command for a motor or actuator to pan or tilt the camera to center the active speaker in the view of the camera. The endpoint device may change the focal point of the camera to select a distance or depth that corresponds to the active speaker. Any combination of these techniques may be used.

Figure 7:
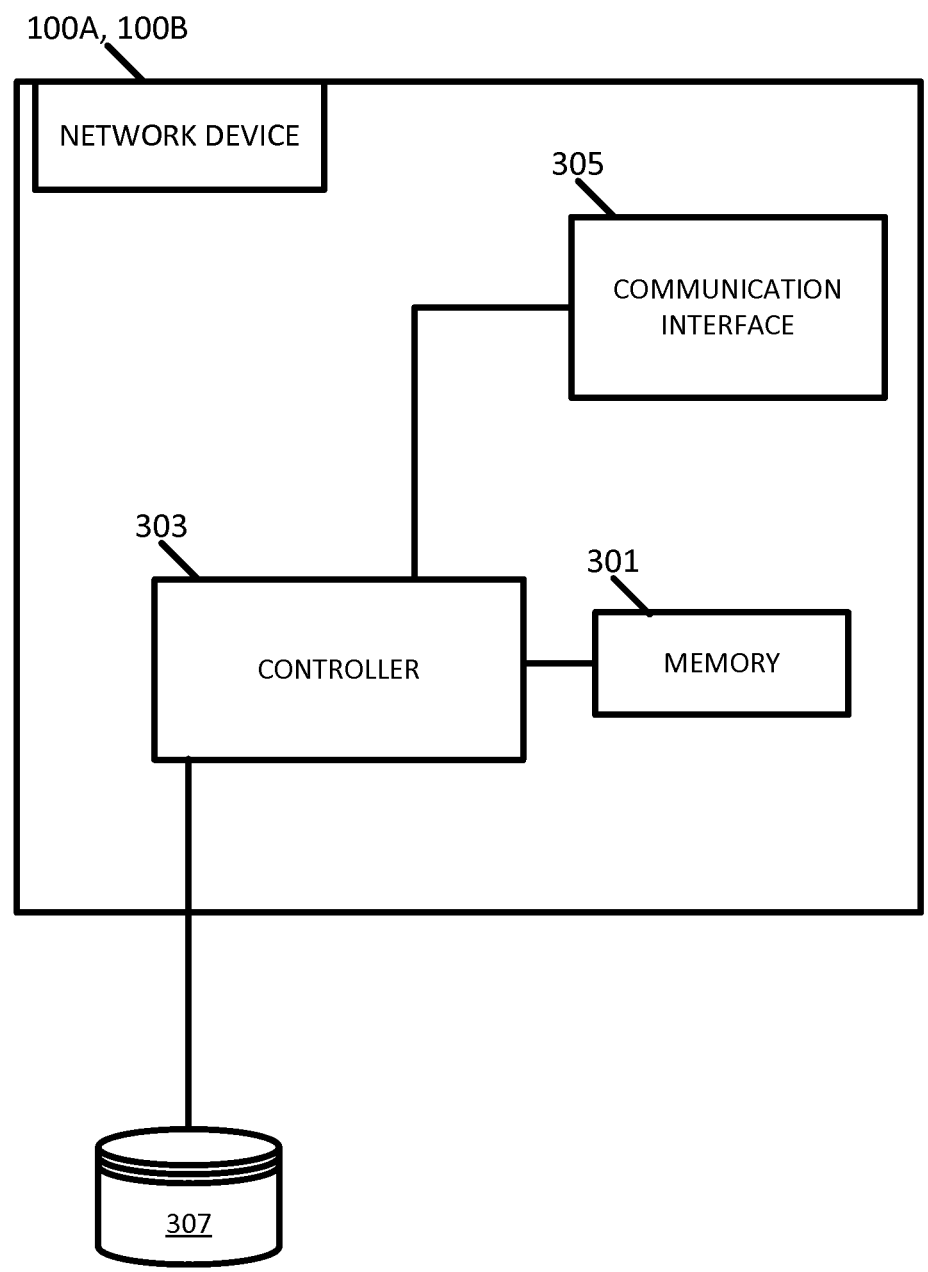
FIG. 7 illustrates an example network device for audio localization.

FIG. 7 illustrates an example network device for audio localization such as a computer, mobile device (e.g., smartphone), or standalone videoconferencing device, which may be referred to alternatively or collectively as a computing device. The computing device includes at least a memory 301, a controller 303, and a communication interface 305. Additional, different, or fewer components may be provided. Different network devices may have the same or different arrangement of components.

Figure 8:
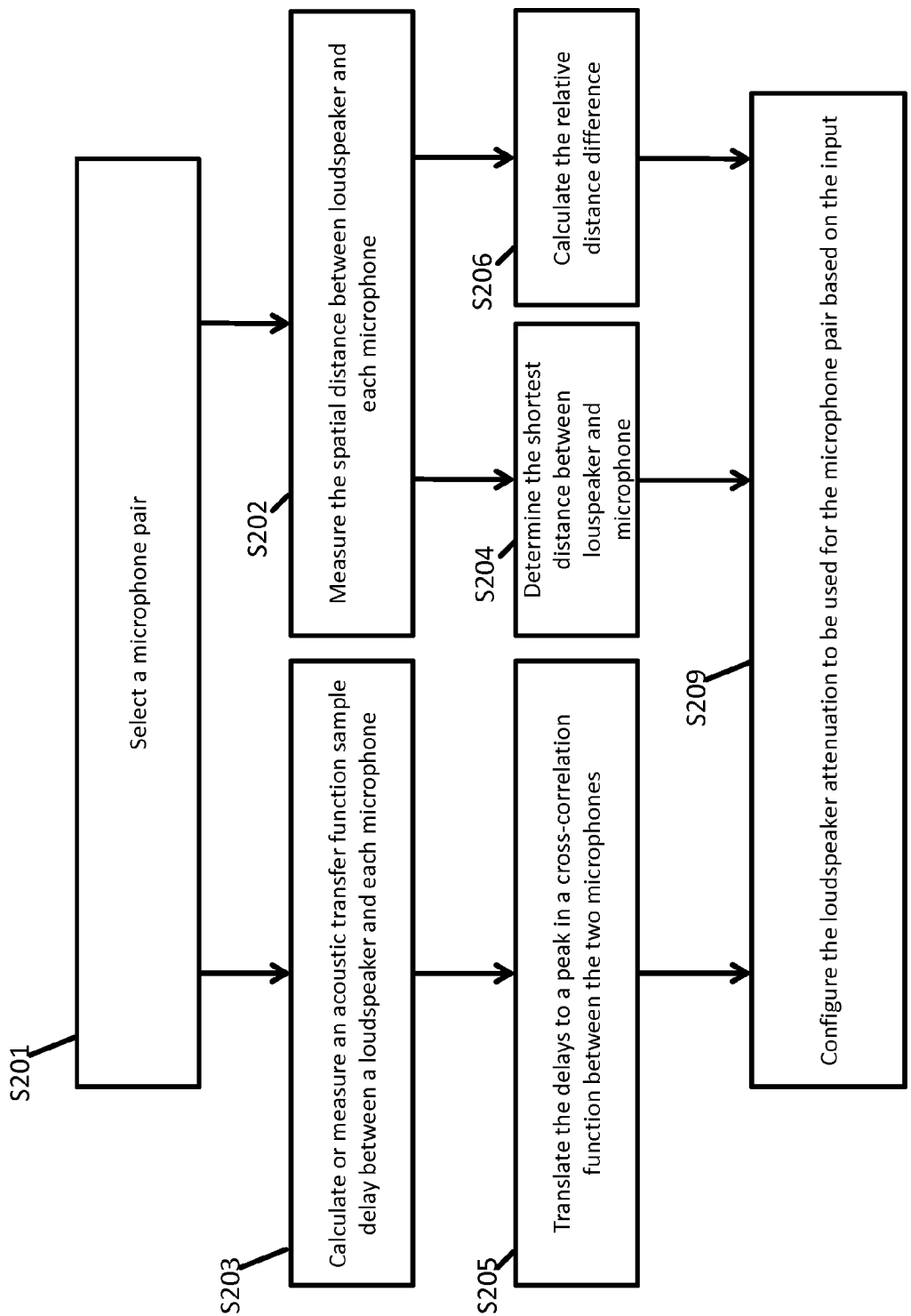
FIG. 8 illustrates an example flowchart for configuration of an attenuation window for improved audio localization using an asymmetric microphone array with integrated loudspeaker.

FIG. 8 illustrates an example flowchart for configuration of an attenuation window for improved audio localization using an asymmetric microphone array with integrated loudspeaker. Additional, different, or fewer acts may be included. The acts are performed in the order shown or other orders. The acts may also be repeated. The acts may be performed by controller 303 as a configuration process, and the configuration values stored in memory 301 and later access for real time active speaker detection.

In act S201, a microphone pair is selected. The flowchart of FIG. 8 may be repeated for multiple pairs of microphone. For example, the flowchart may be repeated for each pair of microphones shown in any of the examples FIGS. 4A-C and 5A-C.

In act S203, the transfer function sample delay between a loudspeaker and each microphone in the microphone pair is calculated or measured. The transfer function sample delay may be determined by sending a test signal to the loudspeaker and comparing the time delay for the test signal to be located in the sampled output of the respective microphones.

In act S205, the delays are translated to a peak in a cross-correlation function between the two microphones. The cross-correlation function describes how much the output of one of the microphones is shifted in time in order to make it identical, or within a variation, to the output of the other microphone.

In act S202 the spatial distance between the loudspeaker and each microphone is measured, either directly using distance measurement device such as a ruler, or in software with the help of a digital 3D CAD model of the microphone array. It may also be derived from the result of act S203 and the knowledge of the sound speed of air.

In act S204 the shortest distance between the loudspeaker and the microphones is determined. The shortest distance corresponds to the microphone in the pair that is closest to the loudspeaker. In act S206, the relative distance difference between the microphones in the pair is calculated.

In act S209, the location of the peak from S205 and the results from acts S204 and S206 are used to tune the width of the attenuation window function and the attenuation factor that may be used to suppress the loudspeaker location in act S105.

The controller 303 may include a general processor, digital signal processor, an application specific integrated circuit (ASIC), field programmable gate array (FPGA), analog circuit, digital circuit, combinations thereof, or other now known or later developed processor. The controller 303 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory. The memory 301 may be removable from the network device 103, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The memory 301 is a non-transitory computer-readable medium, which may be a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving sound data from a planar arrangement of microphones, wherein the planar arrangement of microphones is asymmetric with respect to a location of a loudspeaker;
   selecting at least one primary pair of microphones from the planar arrangement of microphones, wherein the at least one primary pair is arranged linearly in a first direction;
   selecting at least one supplemental pair of microphones from the planar arrangement of microphones, wherein the at least one supplemental pair is arranged linearly in a second direction at an angle to the first direction;
   modifying a first cross correlation function for the at least one primary pair of microphones based on a first window and a first attenuation factor;
   modifying a second cross correlation function for the at least one supplemental pair of microphones based on a second window and a second attenuation factor;
   calculating the first attenuation factor as a function of a distance between a closest microphone in the primary pair of microphones and the loudspeaker; and
   calculating the second attenuation factor as a function of a distance between a closest microphone in the supplemental pair of microphones and the loudspeaker.

2. The method of claim 1, further comprising:
   calculating the first window as a function of a sampling frequency and a distance between the microphones of the primary pair of microphones; and
   calculating the second window as a function of the sampling frequency and a distance between the microphones of the supplemental pair of microphones.

3. The method of claim 2, wherein the first window or the second window is also based on an upsampling factor.

4. The method of claim 1, further comprising:
   combining the first cross correlation function and the second cross correlation function; and
   performing a peak detection algorithm on the combined first cross correlation function and the second cross correlation function.

5. The method of claim 4, further comprising:
   determining an active speaker location based on the peak detection algorithm.

6. The method of claim 5, further comprising:
   calculating a camera position based on the active speaker location;
   or modifying a videoconference based on the active speaker location.

7. The method of claim 1, wherein the planar arrangement of microphones includes at least six microphones coplanar with the loudspeaker.

8. The method of claim 1, wherein the at least one primary pair of microphones includes four microphones.

9. The method of claim 8, further comprising:
calculating an azimuth value based on sound data from the four microphones.

10. The method of claim 1, wherein the at least one supplemental pair of microphones includes two microphones mutually exclusive of the at least one primary pairs of microphones.

11. The method of claim 1, further comprising:
calculating an elevation value based on sound data from at least one microphone from the primary pair of microphones and at least one microphone from the supplemental pair of microphones.

12. An apparatus comprising:
a processor; and
a memory comprising one or more instructions executable by the processor to:
receive sound data from a planar arrangement of microphones, wherein the planar arrangement of microphones is asymmetric with respect to a location of a sound source;
select at least one primary pair of microphones from the planar arrangement of microphones, wherein the at least one primary pair is arranged linearly in a first direction;
select at least one supplemental pair of microphones from the planar arrangement of microphones, wherein the at least one supplemental pair is arranged linearly in a second direction at an angle to the first direction;
attenuate the sound source in a cross-correlation function for the at least one primary pair of microphones based on a first window or a first attenuation factor;
attenuate the sound source in a cross-correlation function for the at least one supplemental pair of microphones based on a second window or a second attenuation factor;
identify a participant direction based on the attenuated sound source;
calculate the first attenuation factor as a function of a distance between a closest microphone in the primary pair of microphones and the sound source; and
calculate the second attenuation factor as a function of a distance between a closest microphone in the supplemental pair of microphones and the sound source.

13. The apparatus of claim 12, the memory comprising one or more instructions executable by the processor to:
select a camera position based on the participant direction.

14. The apparatus of claim 12, wherein the sound source is a cooling fan.

15. The apparatus of claim 12, the memory comprising one or more instructions executable by the processor to:
calculate the first window as a function of a sampling frequency and a distance between the microphones of the primary pair of microphones; and
calculate the second window as a function of the sampling frequency and a distance between the microphones of the supplemental pair of microphones.

16. An apparatus comprising:
a camera;
a loudspeaker;
a plurality of microphones configured to produce sound data, wherein a first number of the plurality of microphones are arranged on a first side of the loudspeaker and a second number of the plurality of microphones are arranged on a second side of the loudspeaker, wherein the first number and the second number are different; and
a processor configured to calculate a cross-correlation of the plurality of microphones based on the sound data and calculate the cross-correlation based on a time-delay window and an attenuation factor, wherein a participant direction is selected based on the attenuated cross correlation,
wherein the processor calculates a first attenuation factor for a first pair of microphones arranged linearly in a first direction based on a distance between a closest microphone in the first pair of microphones and the loudspeaker, and calculates a second attenuation factor for a second pair of microphones arranged linearly in a second direction at an angle to the first direction based on a distance between a closest microphone in the second pair of microphones and the loudspeaker.

17. The apparatus of claim 16, wherein the time-delay window for each pair of microphones is based on a sampling frequency and a distance between the pair of microphones.

* * * * *